(12) United States Patent
Nishimura et al.

(10) Patent No.: US 7,455,511 B2
(45) Date of Patent: Nov. 25, 2008

(54) MOLD CLAMPING MECHANISM FOR INJECTION MOLDING MACHINE

(75) Inventors: Koichi Nishimura, Susono (JP);
Nobuaki Hashimoto, Fujiyoshida (JP);
Shingo Okada, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/725,497

(22) Filed: Mar. 20, 2007

(65) Prior Publication Data

US 2007/0224308 A1    Sep. 27, 2007

(30) Foreign Application Priority Data

Mar. 24, 2006    (JP)    ............... 2006-083087

(51) Int. Cl.
*B29C 45/64*    (2006.01)
(52) U.S. Cl. ............... 425/190; 425/595; 100/258 A
(58) Field of Classification Search ................. 425/190, 425/589, 595, 451.9; 100/258 A
See application file for complete search history.

(56) References Cited

U.S. PATENT DOCUMENTS

| | | | | |
|---|---|---|---|---|
| 4,948,358 | A * | 8/1990 | Kushibe et al. | 425/589 |
| 5,354,196 | A | 10/1994 | Ziv-Av | |
| 5,454,709 | A * | 10/1995 | Leonhartsberger et al. | 425/589 |
| 5,650,182 | A * | 7/1997 | Fuller et al. | 425/589 |
| 5,910,328 | A | 6/1999 | Oshiro et al. | |
| 6,186,771 | B1 * | 2/2001 | Damkj.ae butted.r | 425/595 |
| 7,134,863 | B2 * | 11/2006 | Yamanaka et al. | 425/190 |
| 7,140,872 | B2 | 11/2006 | Nishimura et al. | |
| 7,217,116 | B2 * | 5/2007 | Nishimura et al. | 425/190 |

FOREIGN PATENT DOCUMENTS

| | | |
|---|---|---|
| DE | 34 02 405 | 4/1985 |
| DE | 296 11 733 | 9/1996 |
| EP | 0 687 541 | 12/1995 |
| JP | 64-069320 | 3/1989 |
| JP | 03-038319 | 2/1991 |
| JP | 6-234143 | 8/1994 |
| JP | 09-207181 | 8/1997 |
| JP | 09-225982 | 9/1997 |
| JP | 2000-238100 | 9/2000 |
| JP | 2000-301569 | 10/2000 |
| JP | 2001-212857 | 8/2001 |
| JP | 2001-239561 | 9/2001 |
| JP | 2004-074454 | 3/2004 |
| JP | 2004-276553 | 10/2004 |

OTHER PUBLICATIONS

Extended European Search Report issued in corresponding European Patent Application No. 07250974.8-2307 on May 16, 2007.

* cited by examiner

*Primary Examiner*—James Mackey
(74) *Attorney, Agent, or Firm*—Staas & Halsey LLP

(57) ABSTRACT

A fall-prevention leg portion is provided projecting rearward from the central bottom portion of a stationary platen. This leg portion is formed with a pin hole, which receives a pivot pin that fixes the stationary platen for angular motion around a vertical axis, and bolt holes, which receive tilt adjusting bolts for adjusting a longitudinal tilt of a mold mounting surface of the stationary platen with respect to the vertical axis. The parallelism between the stationary platen and the movable platen can be easily adjusted by regulating the angular motion of the stationary platen around the pivot pin and the longitudinal tilt of the stationary platen by the adjusting bolts.

10 Claims, 2 Drawing Sheets

MOLD CLAMPING MECHANISM FOR INJECTION MOLDING MACHINE

BACKGROUND OF THE INVENTION

1. Field of the Invention

The present invention relates to a mold clamping mechanism of an injection molding machine in which a stationary platen is allowed to rotate so that the parallelism between the stationary platen and a movable platen can be adjusted.

2. Description of the Related Art

In a mold clamping mechanism of an injection molding machine, in general, a stationary platen is fixed to a base frame of an injection molding machine, and the stationary platen and a rear platen are coupled by tie bars. Further, a linear guide for guiding the movable platen in movement is provided on the base frame. The movable platen is moved on the linear guide between the stationary platen and the rear platen directly by a drive source on the rear platen or by means of a toggle mechanism. By doing this, a movable-side mold mounted on the movable platen and a stationary-side mold mounted on the stationary platen are opened, closed, or clamped.

In a well-known mold clamping mechanism of an injection molding machine, a stationary platen fitted with a stationary-side mold is configured to slide on a base frame, and a rear platen is fixed on the base frame.

When a molten material is injected into molds (movable- and stationary-side molds) to form a molded product, the molds are closed and clamped by the mold clamping mechanism. In this case, the stationary- and movable-side molds must be uniformly clamped throughout the surface. To attain this, corresponding surfaces of the stationary and movable platen on which the stationary- and movable-side molds are mounted, respectively, are expected to be parallel to each other. In molding a product that requires high molding accuracy, in particular, the respective opposed surfaces of the stationary platen and the movable platen should be parallel to each other. If this parallelism is low, some molds may be broken.

In a mold clamping mechanism of a type such that a stationary platen is fixed on a base frame, the stationary platen cannot be reoriented in order to adjust the parallelism with a movable platen. In a mold clamping mechanism of a type such that a stationary platen is slidable with respect to a base frame without being fixed to it, on the other hand, a linear guide for guiding a movable platen is extended so that it can also guide the stationary platen in movement. In this known arrangement (Japanese Patent Application Laid-Open No. 3-38319), the stationary platen can be bent uniformly to secure the parallelism between the stationary platen and the movable platen.

In another known arrangement (Japanese Patent Application Laid-Open No. 9-207181), a stationary platen is configured to slide on a base frame so that its upper and lower ends can be freely uniformly deformed by a reaction force of a clamping force, whereby the stationary platen can be prevented from being bent as the clamping force is generated.

In another known arrangement (Japanese Patent Application Laid-Open No. 2000-238100), moreover, a leg portion that is narrower than the space between tie bars is formed protruding from the lower end of a stationary platen, and it is fixed on a base frame. Thus, only the central part of the stationary platen is restricted by the base frame, and the left- and right-hand end portions of the stationary platen are free from thermal expansion.

In still another known arrangement (Japanese Patent Application Laid-Open No. 2001-212857), a stationary platen is mounted on a base frame by a mounting member for movement with respect to the base frame, and the lower part of the stationary platen is allowed to move with respect to the base frame by shock absorbing means, such as a spring, on the mounting member. By doing this, the stationary platen can be prevented from being bent as a clamping force is generated.

In another known arrangement (Japanese Patent Application Laid-Open No. 2004-74454), furthermore, a stationary platen and a rear platen are both located on a base frame for movement with respect to the base frame, and at least one of tie bars that couple the stationary platen and the rear platen is anchored to the base frame. By doing this, the stationary platen can be prevented from being bent as a clamping force is generated.

In a further known arrangement (Japanese Patent Application Laid-Open No. 6-234143), a stationary platen is configured to rotate around a horizontal axis at its central part so that its orientation can be changed. In another arrangement (Japanese Patent Application Laid-Open No. 9-225982), a stationary platen and a rear platen are fixed at their respective horizontal central parts on a base frame, and a position where the stationary platen is fixed to the base frame is slidable. Thus, distortion of the stationary platen can be made vertically symmetric and uniform as a clamping force is generated. Likewise, in still another arrangement (Japanese Patent Application Laid-Open No. 2000-301569), the horizontal central part of a stationary platen is rotatably supported on a base frame, whereby a clamping force can be uniformly applied to the whole surfaces of molds.

Based on the assumption that the stationary platen and the movable platen are parallel, the techniques described in the above eight patent documents are intended to prevent, or equalize, bending of the stationary platen as the clamping force is generated.

In another known arrangement (Japanese Patent Application Laid-Open No. 1-69320), a support is fixed to a leg portion of a movable platen and placed on a guide mounting plate that is fixed to a guide block of a linear movement guide. The guide mounting plate and the movable platen are rotatably coupled together with a pin so that the orientation of the movable platen with respect to its moving direction is adjustable. Thus, the parallelism between the movable platen and a stationary platen can be adjusted.

According to the above patent document, Japanese Patent Application Laid-Open No. 1-69320, the parallelism between the stationary platen and the movable platen is adjusted by reorienting the movable platen with respect to its moving direction. There is an assumption that the stationary platen extends at right angles to the liner movement guide along which it moves, and the orientation of the stationary platen is not adjustable.

In still another known arrangement (Japanese Patent Application Laid-Open No. 2004-276553), a second base frame separate from a base frame that supports a stationary platen and a rear platen is provided with a linear guide, in order to prevent the parallelism between the stationary platen and a movable platen from being ruined as the base frame is bent by the weights of the stationary platen, rear platen, and movable platen. Even if the base frame is bent, therefore, the parallelism between the stationary platen and the movable platen can be maintained with high accuracy by moving the movable platen along the linear guide.

SUMMARY OF THE INVENTION

A mold clamping mechanism of an injection molding machine to which the present invention is applied includes a stationary platen mounted on a base frame, a linear guide, and a movable platen placed on the linear guide, the movable platen being configured to move toward or away from the stationary platen along the linear guide. The stationary platen has angle adjusting means configured to rotate the stationary platen around a vertical axis.

The angle adjusting means may include coupling means for coupling the stationary platen to the base frame so that the stationary platen can rotate around the vertical axis and fixing means for fixing the stationary platen to the base frame. The coupling means may include a pin and a pin hole in a bottom portion of the stationary platen.

The stationary platen may be provided with tilt adjusting means for adjusting a tilt of the mold mounting surface of the stationary platen with respect to the vertical axis. Further, the tilt adjusting means may be a bolt.

According to the mold clamping mechanism of the injection molding machine of the present invention, the angular movement of the stationary platen around its vertical axis is adjustable by the angle adjusting means, and a longitudinal tilt with respect to the vertical axis is also adjustable by regulating the height of the adjusting bolt. Thus, the respective mold mounting surfaces of the stationary platen and the movable platen can be adjusted to be parallel to each other. If the stationary platen and the linear guide for guiding the movable platen in movement are not on the same base frame, the orientation of the stationary platen can be finely adjusted. According to the present invention, the attitude of the stationary platen is adjusted so that the respective mold mounting surfaces of the stationary platen and the movable platen are parallel. This can be done with a simpler arrangement than in the case where the attitude of the movable platen is adjusted so that the respective mold mounting surfaces of the movable platen and the stationary platen are parallel.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE EMBODIMENTS

Figure 1:
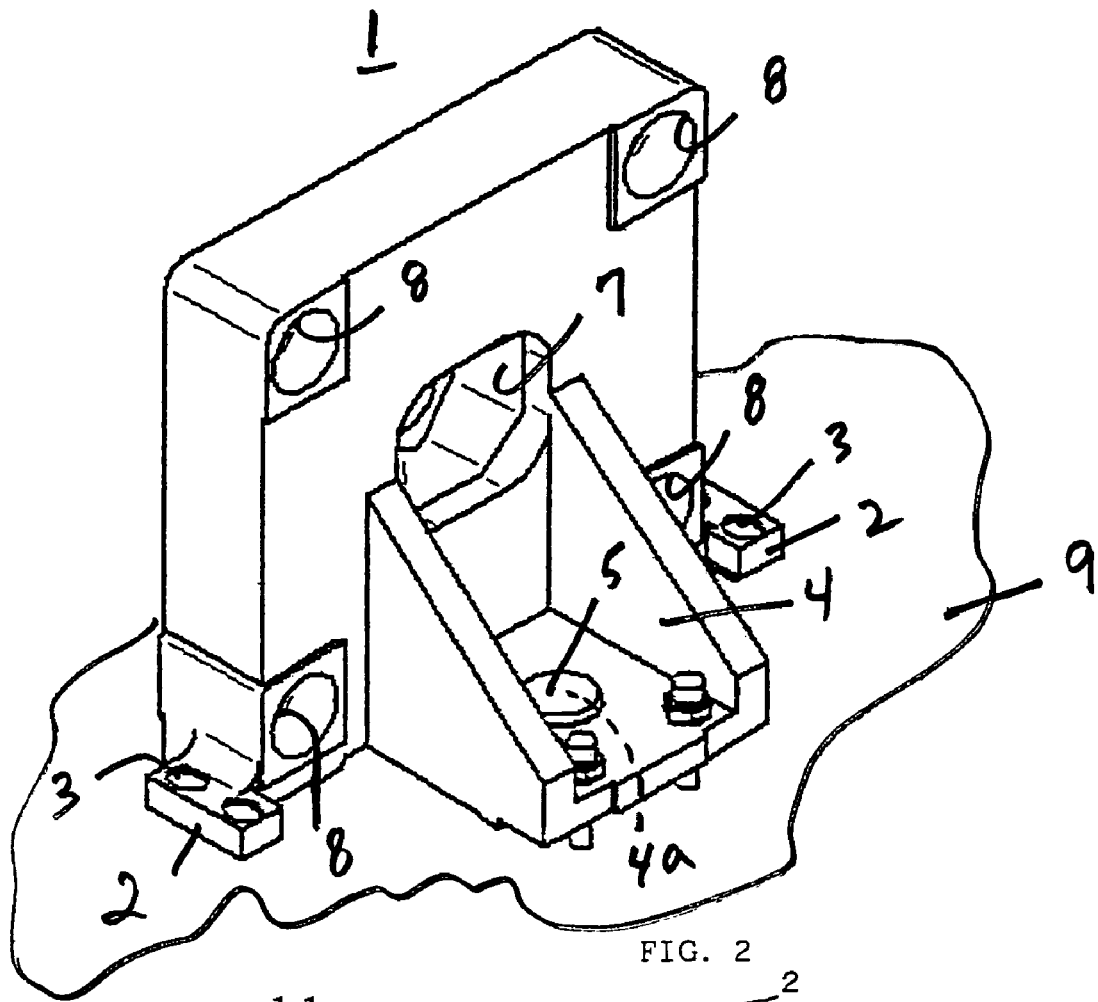
FIG. 1 is a perspective view of a stationary platen of one embodiment of a mold clamping mechanism of an injection molding machine according to the present invention.

Leg portions 2 for fixing a stationary platen 1 on a base frame 9 are formed individually on the left- and right-hand sides of the lower part of the stationary platen 1. Each leg portion 2 has at least one bolt hole 3 with which the stationary platen 1 is bolted on the base frame. Further, a fall-prevention leg portion 4 is formed protruding rearward from the central part of the bottom portion of the stationary platen 1, or protruding from the surface of the stationary platen 1 opposite the surface 1a on which a stationary-side mold is mounted toward the location of an injection mechanism (not shown). The leg portion 4 serves to prevent the stationary platen 1 from falling down under a clamping force or injection pressure. The fall-prevention leg portion 4 is formed with a pin hole 4a. As a pivot pin 5 is fitted in the pin hole 4a, the stationary platen 1 having the leg portion 4 can rotate around the pin 5 with respect to the base frame.

The stationary platen 1 is coupled to the base frame by angle adjusting means, which is composed of the pin hole in the fall-prevention leg portion 4, the pivot pin 5 fitted in the pin hole, the bolt holes 3 in the leg portions 2 formed on the left- and right-hand sides of the lower part of the stationary platen 1, and a bolt 3a in engagement with the bolt hole 3. Each of the bolt holes 3 in the leg portions 2 formed on the opposite sides of the stationary platen 1 is formed of a slot having a length that corresponds to the range of angular movement of each leg portion 2 when the platen 1 rotates around the axis (vertical axis) of the pivot pin 5 with respect to the base frame.

Bolt holes 6a are formed individually on left- and right-hand sides of the rear end portion of the fall-prevention leg portion 4. They individually receive tilt adjusting bolts 6 for adjusting the rocking attitude (tilt) of the stationary platen 1 with respect to the base frame. The tilt adjusting bolts 6 are located in positions off the body of the stationary platen 1, that is, in positions apart from the mold mounting surface of the platen 1.

In FIG. 1, reference numeral 7 denotes a locating hole into which an injection nozzle (not shown) that constitutes an injection mechanism is inserted. Further, reference numeral 8 denotes each of coupling holes for coupling tie bars that connect the stationary platen 1 and a rear platen (not shown).

Figure 2:
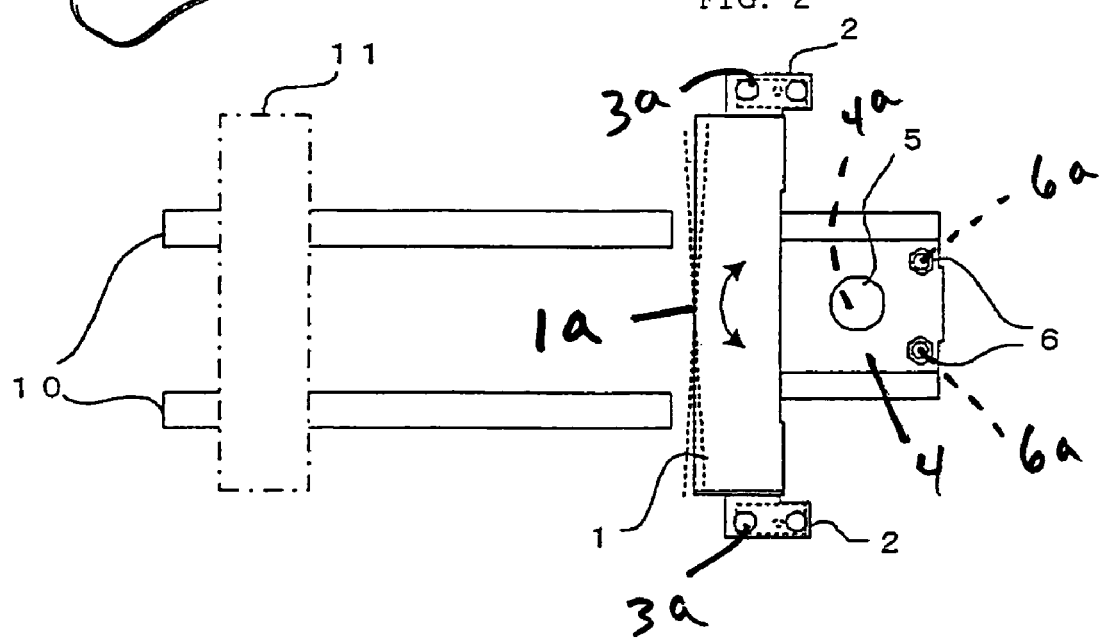
FIG. 2 is a top view of the mold clamping mechanism including the stationary platen of FIG. 1, mainly showing the stationary platen.
Figure 3:
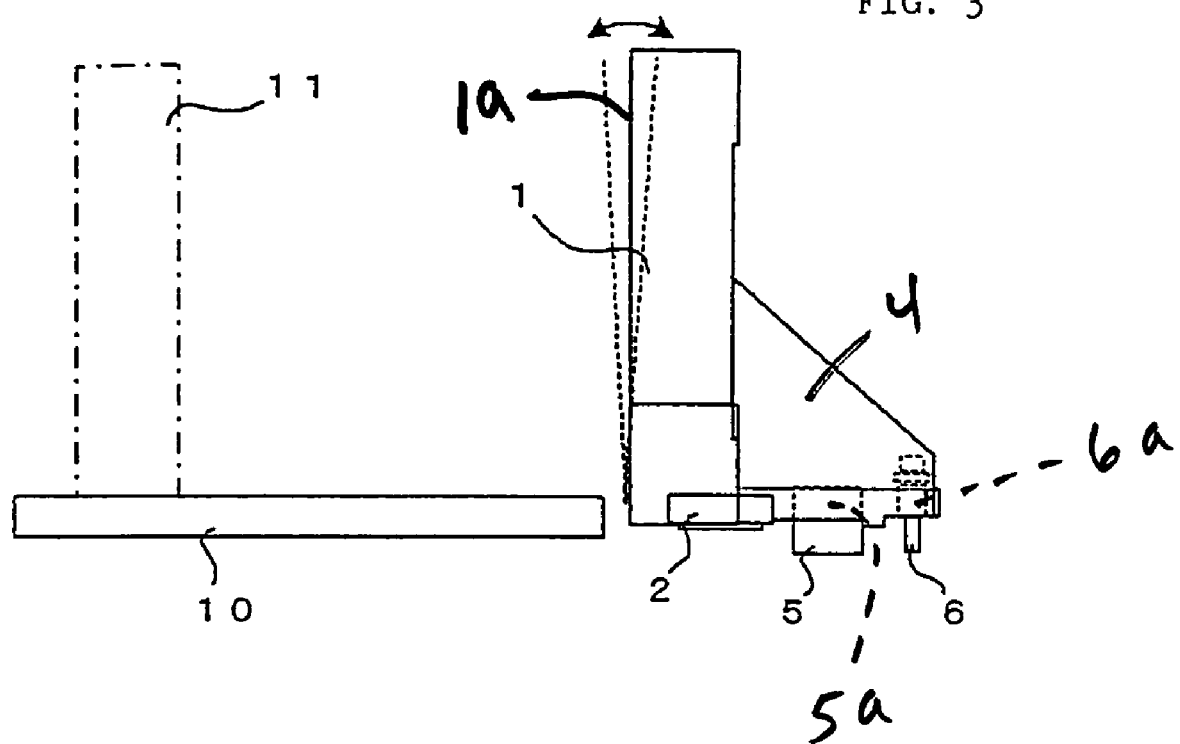
FIG. 3 is a side view of the mold clamping mechanism of FIG. 2.

In FIGS. 2 and 3, reference numeral 10 denotes each of linear guides for guiding a movable platen 11 in linear movement. Guided by the linear guides 10, the movable platen 11 moves from side to side as in FIGS. 2 and 3, thereby performing mold closing, clamping, and opening operations in conjunction with a stationary-side mold (not shown) mounted on the stationary platen 1 and a movable-side mold (not shown) mounted on the movable platen 11.

In the mold clamping operation, the respective mold mounting surfaces of the stationary platen 1 and the movable platen 11 should extend parallel to each other. The movable platen 11 is guided by the linear guides 10 as it moves so that its mold mounting surface is translated. In order to adjust the stationary platen 1 so that its mold mounting surface is parallel to that of the movable platen 11, therefore, the stationary platen 1 is caused to rotate around the pivot pin 5 or the vertical axis, as shown in FIG. 2, whereby the stationary platen 1 is reoriented with respect to the movable platen 11, as indicated by broken line in FIG. 2.

On the other hand, the tilt of the mold mounting surface of the stationary platen 1 with respect to the vertical axis (i.e., tilt in the longitudinal direction of the stationary platen 1) can be adjusted by changing the projection amount or height of the tilt adjusting bolts 6 that project from the bottom surface of the fall-prevention leg portion 4 toward the base frame side, as shown in FIG. 3.

The stationary platen 1 is rotated around the vertical axis by being rotated around the pivot pin 5, and forward and backward tilting of the stationary platen 1 with respect to the vertical axis is adjusted by changing the height of the tilt adjusting bolts 6. By doing this, the orientation of the mold mounting surface of the platen 1 can be adjusted so that it is parallel to the mold mounting surface of the movable platen 11. After this adjustment, bolts are screwed into the bolt holes 3 in the leg portions 2 formed on the opposite sides of the lower portion of the stationary platen 1, whereby the platen 1 is fixed to the base frame.

According to the present invention, the parallelism between the respective mold mounting surfaces of the stationary platen 1 and the movable platen 11 is adjusted by reorienting the mold mounting surface of the stationary platen 1. Thus, the adjustment can be made more easily with a simpler arrangement than in the case where the mold mounting surface of the movable platen 11 is reoriented.

The movable platen 11 has holes 8 through which the tie bars are passed. Guided by the tie bars passed through the holes and by the linear guides, the movable platen 11 moves in the longitudinal direction between the rear platen and the stationary platen 1. Thus, a complicated arrangement would be required in order to adjust the parallelism between the respective mold mounting surfaces of the stationary platen 1 and the movable platen 11 by reorienting the mold mounting surface of the movable platen, that is, by rotating the stationary platen 1 around the vertical axis to adjust the longitudinal tilt with respect to the vertical axis. Since the stationary platen is reoriented without requiring the adjustment of the movable platen, in the case of the present invention, however, the arrangement for and the procedure of the adjustment are simple.

Also in the case of a mold clamping mechanism of a type such that the movable platen is located on a base frame that is independent of the base frame on which the stationary platen is mounted (described in, e.g., Japanese Patent Application Laid-Open No. 2004-276553), the present invention can be applied to reorient the stationary platen, thereby enabling the adjustment of the parallelism between the respective mold mounting surfaces of the stationary platen 1 and the movable platen 11 with a simple structure.

What is claimed is:

1. A mold clamping mechanism of an injection molding machine, comprising a stationary platen mounted on a base frame of the injection molding machine, a linear guide, and a movable platen placed on the linear guide, the movable platen being configured to move toward or away from the stationary platen along the linear guide, wherein said stationary platen has a leg portion protruding toward a location where an injection mechanism is to be mounted; and the leg portion has a center of rotation and is provided with angle adjusting means for allowing the stationary platen to rotate around a vertical axis passing through the center of rotation, and tilt adjusting means for adjusting a tilt of a mold mounting surface of the stationary platen with respect to the vertical axis.

2. The mold clamping mechanism according to claim 1, further comprising two or more tie bars connecting the stationary platen with a rear platen, wherein said movable platen is caused to move toward or away from the stationary platen along the tie bars.

3. The mold clamping mechanism according to claim 1, wherein the angle adjusting means includes coupling means for coupling the stationary platen to the base frame so that the stationary platen can rotate around the vertical axis, and fixing means for fixing the stationary platen to the base frame.

4. The mold clamping mechanism according to claim 3, wherein the coupling means includes a pin and a pin hole in a bottom portion of the stationary platen.

5. The mold clamping mechanism according to claims 1,2,3, or 4, wherein the tilt adjusting means comprises a bolt.

6. A mold clamping mechanism of an injection molding machine, comprising a stationary platen mounted on a base frame of the injection molding machine, a linear guide, and a movable platen placed on the linear guide, the movable platen being configured to move toward or away from the stationary platen along the linear guide, wherein said stationary platen has a leg portion protruding toward a location where an injection mechanism is to be mounted; and the leg portion has a center of rotation and is provided with an angle adjuster to allow the stationary platen to rotate around a vertical axis passing through the center of rotation, and a tilt adjuster to adjust a tilt of a mold mounting surface of the stationary platen with respect to the vertical axis.

7. The mold clamping mechanism according to claim 6, further comprising two or more tie bars connecting the stationary platen with a rear platen, wherein said movable platen is caused to move toward or away from the stationary platen along the tie bars.

8. The mold clamping mechanism according to claim 6, wherein the angle adjuster includes a coupler to couple the stationary platen to the base frame so that the stationary platen can rotate around the vertical axis, and a member to fix the stationary platen to the base frame.

9. The mold clamping mechanism according to claim 8, wherein the coupler includes a pin and a pin hole in a bottom portion of the stationary platen.

10. The mold clamping mechanism according to claims 6, 7, 8 or 9, wherein the tilt adjuster comprises a bolt.

* * * * *